Dec. 23, 1958     F. P. CHAUSSEE     2,865,471
ANTI-SKID DEVICE FOR VEHICLES
Filed Dec. 26, 1956     2 Sheets-Sheet 1
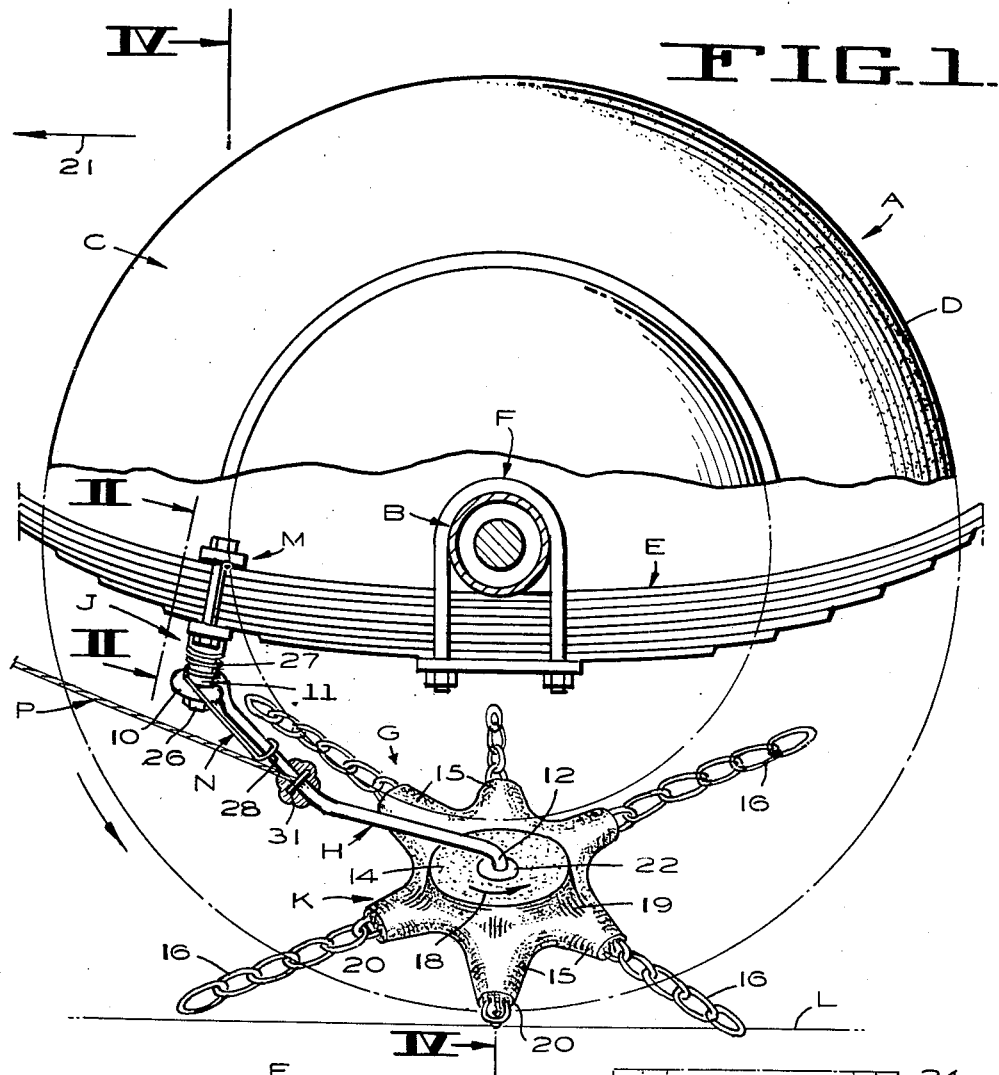
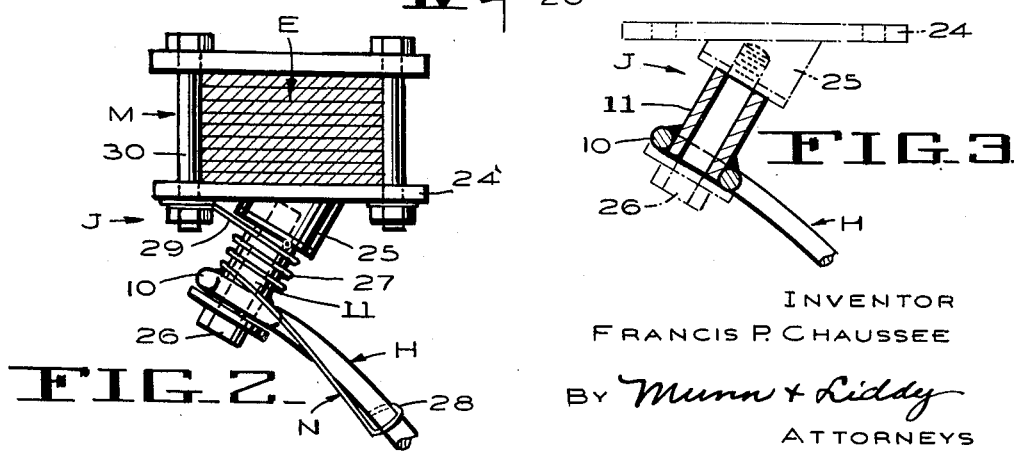
INVENTOR
FRANCIS P. CHAUSSEE
BY Munn & Liddy
ATTORNEYS

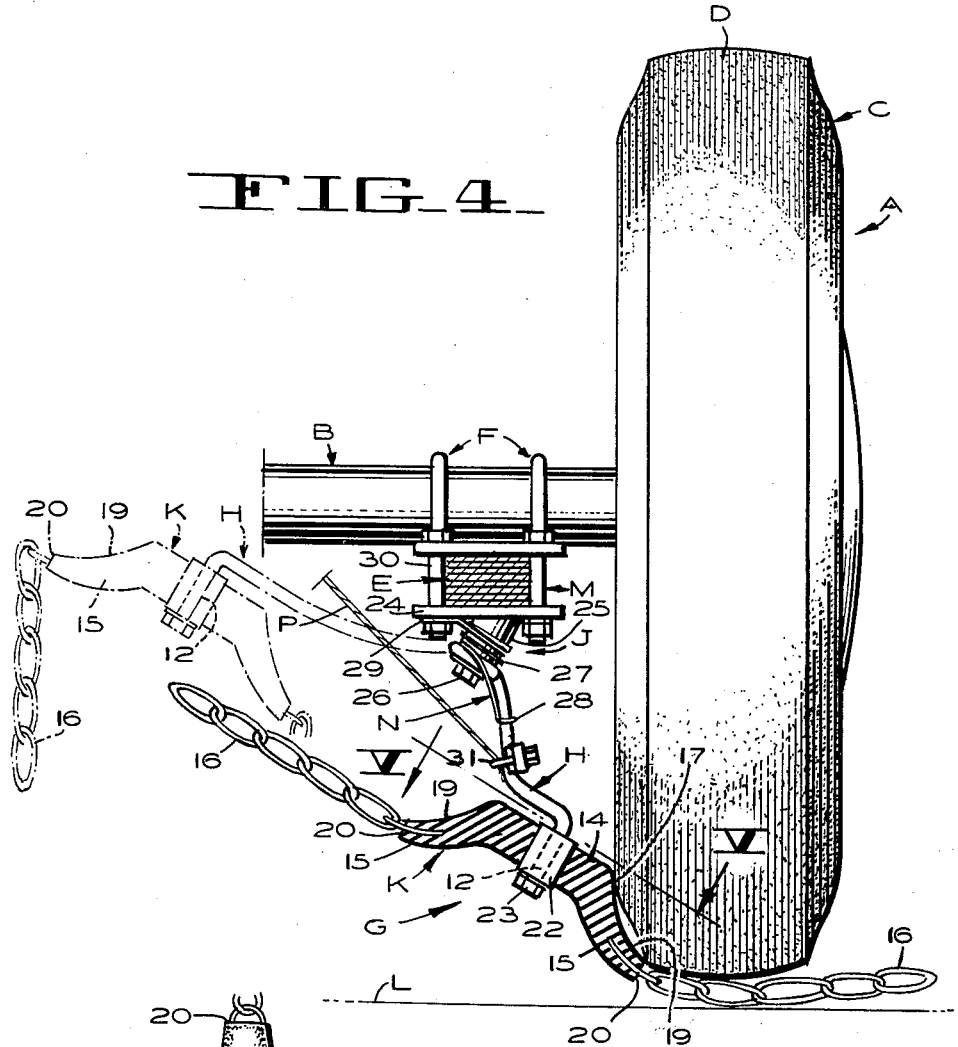

United States Patent Office 2,865,471
Patented Dec. 23, 1958

2,865,471

ANTI-SKID DEVICE FOR VEHICLES

Francis P. Chaussee, Wenatchee, Wash.

Application December 26, 1956, Serial No. 630,494

3 Claims. (Cl. 188—4)

The present invention relates to improvements in an anti-skid device for vehicles. It has particular reference to improvements over the anti-skid device shown in my United States Patent No. 2,277,036, dated March 24, 1942.

As disclosed in the foregoing patent, a disc-shaped drive member is provided, which is movable into a position to frictionally contact with the tire of the vehicle so as to be rotated thereby. This drive member has a number of chain sections extending therefrom so as to be successively thrown under the tread of the tire as the drive member is rotated by the tire. In this manner, the tire may be prevented from skidding on the roadway. Normally, the drive member and its chain sections are disposed in an elevated position so as to clear the roadway. However, when the driver desires to render the anti-skid device effective, it may be readily moved into operative position by means controllable from a location conveniently accessible to the driver.

As the cardinal objects of the present invention, it is proposed: (1) to provide an improved drive member which is designed so as to more effectively throw the chain sections under the tread of the tire; and (2) to simplify the mounting means for the drive member.

Other objects and advantages will appear as the specification proceeds. The novel means will be set forth in the appended claims.

*Drawings*

For a better understanding of the invention, reference should be had to the accompanying drawings, forming part of this specification, in which:

Figure 1 is a side elevational view of the anti-skid device, disclosing it as being arranged in operative relation with respect to the left rear wheel of a vehicle, a portion of this wheel being broken away;

Figure 2 is a transverse sectional view taken along the plane II—II of Figure 1, illustrating a clamp as being secured to the leaf spring of the vehicle, and further showing the upper portion of a swingable arm that provides a support for the drive member of the anti-skid device;

Figure 3 is a sectional view disclosing the means for pivotally connecting the arm to the clamp on an inclined axis;

Figure 4 is a transverse sectional view taken along the line IV—IV of Figure 1; and Figure 5 is a top plan view of the drive member, as seen from the inclined plane V—V of Figure 4.

While I have shown only the preferred form of my invention, it should be understood that various changes, or modifications, may be made within the scope of the annexed claims without departing from the spirit thereof.

*Detailed description*

Referring to the drawings in detail, it will be noted that I have shown the left rear wheel A of a vehicle as being mounted on the rear axle housing B. This wheel is provided with a tire C having the usual road-engaging tread D thereon. As is well-known in the automotive art, a leaf spring E is connected intermediate of its ends by a clamp F to the axle housing B. Of course, the opposite ends of this leaf spring are coupled to the chassis frame by brackets (not shown), with the spring extending lengthwise of the vehicle.

It will be observed that my improved anti-skid device is designated generally at G, and it includes the following main components: (1) a swingably-mounted arm H; (2) a pivotal support J for one end of the arm; and (3) a drive member K rotatably connected to the other end of this arm.

In its structural features, the arm H is provided with an eyelet 10 at its pivoted end, which is welded or otherwise secured to a tubular sleeve 11. The opposite end of this arm is fashioned with a spindle 12 on which the drive member K is journalled for free rotation thereon.

The drive member K is made from resilient material, such as rubber or rubber composition. It defines a circular hub 14 having a plurality of resilient fingers 15 projecting radially therefrom. Moreover, a plurality of elongated anti-skid flexible members or chain sections 16 are provided, corresponding in number with the fingers. One end of each chain section is anchored to a finger, and the chain sections extend freely from the fingers.

When the arm H is swung into its lowered position, as shown in Figures 1 and 4, the circular hub 14 will frictionally contact with a lower peripheral portion 17 of the wheel tire C, whereby the drive member will be rotated by the tire as the latter is turned (see arrow 18 in Figure 1). The outer ends of the flexible fingers will travel through a circle that is tangent to another circle formed by one side of the tire tread at a place where the tire tread portion contacts with the roadway. When the member K contacts the tire C, the point of tangency between the two circles will lie in a vertical, transversely-extending plane that also passes through the axis of rotation of the tire. The arm H extends substantially rearwardly from its pivotal mounting J and parallels the plane of the tire wheel A when the arm is in inoperative position. The fingers 15 are located so as to successively throw the chain sections 16 between the tread D of the tire and the roadway L (see Figure 4), as the drive member K is rotated, thereby preventing skidding of the tire.

It should be noted that each of the resilient fingers 15 defines a concave upper face 19, which is designed to receive the peripheral section 17 of the tire C, when the circular hub 14 contacts with the tire and the drive member is rotated by the tire. Also, each of the resilient fingers has an outer end 20, which is disposed to be moved into a position substantially in registration with the underneath surface of the tire tread D, when the drive member K is rotated by the tire C. This arrangement will facilitate moving the chain into a position underlying the tire and extending transversely to the tire tread, as the vehicle is advanced in the direction of the arrow 21 (see Figure 1).

In order to permit free rotation of the drive member K, the latter is provided with a suitable bearing 22 through which the spindle 12 extends. The lower end of this spindle has a nut 23 threaded thereon so as to retain the spindle in the bearing.

With respect to the details of the pivotal support J, Figures 1, 2 and 4 disclose this support as including a clamp M, which is secured to the leaf spring E. However, I do not wish to be limited in this respect, since it is obvious that the clamp may be applied to some other member of the vehicle for support thereby.

The lower bar 24 of the clamp M has a lug 25 on its underneath side (see Figures 2 and 3), into which a stud or bolt 26 is threaded. This stud constitutes a pivot element, which is inclined with respect to the vertical. It will be quite apparent that the inclined stud 26 has the sleeve 11 of the arm H rotatably disposed thereon.

For the purpose of yieldingly urging the swingable arm H into a lowered position, wherein the drive member K will frictionally contact with the tire C, a spring N has been provided. The intermediate part of this spring defines coils 27, which encircle the sleeve 11. One end of this spring is provided with a hook 28, which extends around an intermediate part of the arm H. The other end 29 of this spring is anchored to a bolt 30 forming part of the clamp M (see Figure 2).

In order to move the swingable arm H about the inclined pivot element (defined by stud 26) in a direction to withdraw the drive member K from contact with the tire C, and to raise this member and its chain sections 16 into an elevated position to clear the roadway L, an arm-actuating element P is provided. The latter has been shown as including a pull cable, which has its lower end secured to the arm H by a clamp 31. Obviously, the other end of this cable may extend upwardly into the driver's compartment so as to be conveniently accessible to the driver.

It will be apparent that any suitable means (not shown) may be provided, whereby the driver may exert a pull on the cable P to thus move the drive member K and its chain sections 16 into an inactive raised position (see dash-dot lines in Figure 4). However, just as soon as the operator releases the cable, the spring N will swing the arm H into a lowered position, wherein the drive member K will contact the tire C so as to be driven when the tire is turned. Thereafter, the chain sections 16 will be successively thrown between the tire tread D and the underlying roadway, as the vehicle continues to advance, thereby preventing the tire from skidding.

Turning to Figure 4, it will be seen that the circular hub 14 of the drive member projects above the resilient fingers 15. Moreover, the length of the spindle 12 substantially parallels the axis of the inclined pivot member or element 26, when the drive member is disposed in either an active tire-contacting position or in an inactive elevated position. With this arrangement, the driving member K will be moved on an inclined plane between its active and inactive positions. Thus the chain sections 16 will depend from the driving member, when the latter occupies its elevated inactive position, and the chain sections will be out of contact with each other to thus reduce noise to the minimum.

I claim:

1. In an anti-skid device for a vehicle having a wheel tire; an arm swingably mounted on the vehicle; a member rotatably mounted on the outer end of the arm and having a circular hub movable into contact with the tire when the arm is swung into operative position and moves the rotatable member therewith; the axis of the hub being inclined to the plane of the tire when the hub contacts the side of the tire; whereby the member will be rotated by the rotating tire; a plurality of resilient fingers extending beyond the hub and having a shape and length to lie in a plane that extends at an angle to the plane of the tire when the hub contacts with the tire to cause the outer ends of the fingers to move through a circle that is substantially tangent to a circle lying in the inclined plane formed by one side of the tire tread at a place where the tire tread portion contacts with the tire-supporting surface; whereby the outer ends of the resilient fingers will move adjacent to the supporting surface when their ends move nearest to the side of the tire; and elongated anti-skid flexible members connected to the outer ends of the fingers; said anti-skid members being successively thrown by the rotating fingers when the outer ends of the fingers are adjacent to the tire tread and to the supporting surface so that the members will lie between the tire tread and the roadway as the tire and first-mentioned member are rotated, the anti-skid members being moved to extend substantially transverse to the tire tread just prior to that portion of the tread contacting the supporting surface to place the members between the tread and supporting surface and thereby prevent skidding of the tire; and means for swinging the arm from inoperative into operative position and vice versa.

2. The combination as set forth in claim 1: and in which each resilient finger has a concave upper surface to receive a peripheral section of the tire when the hub contacts with the tire and the end of the finger is moving through that portion of its circle that extends through the point of tangency with said other circle formed by the said side of the tire tread.

3. The combination as set forth in claim 1: and in which said arm extends substantially rearwardly from its pivotal mounting and parallels the plane of the tire wheel when the arm is in operative position so as to cause the point of tangency between the two aforementioned circles to lie in a vertical transversely-extending plane that also passes through the axis of rotation of the wheel tire.

References Cited in the file of this patent
UNITED STATES PATENTS

| | | |
|---|---|---|
| 1,374,252 | Thorne et al. | Apr. 12, 1921 |
| 2,241,923 | Ridgway | May 13, 1941 |
| 2,277,036 | Chaussee | Mar. 24, 1942 |
| 2,747,691 | Lakey et al. | May 29, 1956 |
| 2,767,809 | Sutter | Oct. 23, 1956 |